United States Patent [15] 3,683,060
Tanabe et al. [45] Aug. 8, 1972

[54] METHOD OF PREPARING BIAXIALLY ORIENTED POLYETHYLENE 2,6-NAPHTHALATE FILM

[72] Inventors: Takashi Tanabe, Kanagawa-ken; Hiroshi Aoiki, Tokyo; Hitoshi Murakami, Fujio Matsumoto, both of Sagamihara-shi, Kanagawaken, all of Japan

[73] Assignee: Teijin Limited

[22] Filed: June 8, 1970

[21] Appl. No.: 44,588

[30] Foreign Application Priority Data

June 13, 1969 Japan ..................44/46574

[52] U.S. Cl. ................264/289, 260/75 T, 264/235, 264/346
[51] Int. Cl. ........B29d 7/22, B29d 7/24, C08g 17/00
[58] Field of Search......264/289, 210, 234, 235, 345, 264/346; 260/75 T

[56] References Cited

UNITED STATES PATENTS

| | | |
|---|---|---|
| 2,968,065 | 1/1961 | Gronholz..................264/289 |
| 2,975,484 | 3/1961 | Amborski.................260/75 T |
| 3,161,711 | 12/1964 | Tassler......................264/289 |

Primary Examiner—Robert F. White
Assistant Examiner—Jeffery R. Thurlow
Attorney—Sherman and Shalloway

[57] ABSTRACT

A biaxially oriented polyethylene 2,6-naphthalate film having superior physical properties in the machine direction such as tensile strength and Young's modulus, particularly useful as a base of magnetic recording tape, is prepared by stretching an undrawn film of polyethylene 2,6-naphthalate consisting essentially of ethylene 2,6-naphthalate units and having an intrinsic viscosity of at least 0.35, first in the machine direction to 3.5–5 times the original length at a temperature ranging from 10°C. above the second order transition temperature of said polyethylene 2,6-naphthalate to 170°C., and then in the transverse direction at a draw ratio 50–90 percent of that of the machine direction stretching at a temperature ranging from 3°C. above said second order transition temperature to 160°C. and satisfying the following relationship $$25X - 770n + 1200 \quad T \quad 22X - 400n + 700,$$

wherein $T$ is the drawing temperature (°C.) when stretching the film in the transverse direction, $X$ is the draw ratio when stretching the film in the transverse direction, and $n$ is the refractive index in the thickness direction of the film after stretching in the machine direction.

4 Claims, No Drawings

METHOD OF PREPARING BIAXIALLY ORIENTED POLYETHYLENE 2,6-NAPHTHALATE FILM

This invention relates to a method of preparing biaxially oriented polyethylene 2,6-naphthalate film. More particularly, the invention relates to a method of preparing biaxially oriented polyethylene 2,6-naphthalate film wherein the undrawn film is stretched at a greater draw ratio in the machine direction than the transverse direction to thereby provide a film which excels especially in its physical properties such, for example, as tenacity, Youngs's modulus and dimensional stability in the machine direction.

Films whose physical properties have been especially improved in the machine direction are used, for example, as the base support of magnetic recording tape as well as other continuous films. Such films have hitherto been made from cellulose acetate or polyethylene terephthalate. However, there is a limit to the tensile strength and dimensional stability in the machine direction in the case of the cellulose acetate film, and moreover it has the drawback that owing to its small modulus of elasticity a magnetic recording tape below a given thickness cannot be made therefrom. On the other hand, in the case of the polyethylene terephthalate film, an increase in the draw ratio in the machine direction which is considerably greater than that in the transverse direction cannot be made by the customary biaxial stretching technique, i.e., the two-stage stretching method wherein the elongation is effected successively in the machine and transverse directions (in the sequence given) and, as a result, it is impossible to obtain directly by the foregoing biaxial stretching technique a film whose physical properties has been improved in the machine direction to such a degree as is presently being demanded. Accordingly, it has been proposed lately to produce polyethylene terephthalate film with improved physical properties in the machine direction by a three-stage method, i.e., stretching the film successively in the machine, transverse and machine directions or a two-stage biaxial stretching method, i.e., first stretching the film in the transverse direction and then in the machine direction. These films are referred to as "tensilized type" film. However, there are drawbacks in that the tensilized film of polyethylene terephthalate, while demonstrating a satisfactory tensile strength or Young's modulus in the machine direction, does not always exhibit a sufficiently high thermal dimensional stability. In addition, since the foregoing successive three-stage stretching method requires a three-stage operation in carrying out the stretching, the operation becomes complicated. On the other hand, in the case of the biaxial stretching method in which the stretching of the film in the transverse direction is first carried out followed by the stretching in the machine direction, there is the drawback that the sideways drawing machine (tenter) must be a heavy duty one because the thicker film must be stretched transversely and the forward drawing machine gets wider because the transversely stretched wide film must be stretched, with the consequence that the control of the stretching conditions are rendered much more difficult. An especially fatal defect is the fact that the more the draw ratio in the machine direction is increased over that in the transverse direction, the greater becomes the orientation in the machine direction and consequently, while the Young's modulus becomes greater in the machine direction, the heat shrinkage in the machine direction also increases concomitantly therewith.

It is therefore an object of the present invention to provide a method of producing directly by the readily carried out biaxial stretching operation, wherein the stretching is first effected in the machine direction and then in the transverse direction, a polyethylene 2,6-naphthalate film which excels in physical properties such as tensile strength and Young's modulus in the machine direction and possesses a low heat shrinkage and hence has good dimensional stability.

Another object of the invention is to provide a new method of producing a very thin polyethylene 2,6-naphthalate film whose gauge variation is small and whose dimensional stability is high.

One specific object of the invention is to provide a method of producing a film suitable for use as the base support of magnetic recording tape.

Other objects and advantages of the invention will become apparent from the following description wherein the present invention is more fully described.

As a result of research into the preparation of films from various polymers, it has been discovered that polyethylene 2,6-naphthalate had a distinctive film-forming property not seen in the other crystalline polyesters and crystalline polyolefins. In the past, when the undrawn film obtained from polyethylene terephthalate or a crystalline polyolefin of isotactic structure was, as previously noted, stretched in the machine direction at, e.g., a draw ratio of 3–5, or even greater, at a temperature somewhat higher than the second order transition temperature of these polymers, the molecules were oriented in the machine direction and in concomitance therewith some crystallization took place. Hence, when a film which has been stretched in the machine direction is subsequently stretched in the transverse direction at a draw ratio lower than the draw ratio at which it was previously stretched in the machine direction, the film is stretched non-uniformly and numerous stretched portions and unstretched portions are formed, thus making it impossible to make a film having a uniform thickness and good physical properties. Consequently, in preparing a film having uniform transverse profile by the biaxial stretching of undrawn films such as hereinabove mentioned wherein the stretching in the machine direction is first carried out, it was generally the practice heretofore to use a draw ratio in the transverse direction of at least equal to that used in the machine direction and, in addition, to use a slightly higher stretching temperature in the transverse direction than in the case of the machine direction.

According to researche, however, it has been found that the undrawn film of polyethylene 2,6-naphthalate, unlike the foregoing undrawn film of polyethylene terephthalate or isotactic polypropylene, has a distinctive characteristic that, as previously indicated, even when the film is first stretched in the machine direction at a high draw ratio of 3–5 and thereafter stretched in the transverse direction at a lower draw ratio, a film with a good transverse profile is obtained. Furthermore, it was found that when this stretching in the transverse direction is carried out at a temperature within a specific range with respect to the draw ratio in the transverse direction and the refractive index of the film after having conducted the stretching of the film in the machine direction, and preferably at a temperature not higher than the stretching temperature that was used in carrying out the preceding stretching in the machine direction, a film with very few gauge variations can be formed. Thus, in accordance with the present invention, biaxially oriented films of polyethylene 2,6-naphthalate having especially improved tensile strength and Young's modulus in the machine direction can be obtained by a simple two-stage stretching operation.

A description of the present invention in still further detail is given hereunder.

According to the present invention, a uniform film of polyethylene 2,6-naphthalate which has been biaxially oriented, as previously noted, and moreover has especially, excellent tensile strength and Young's modulus in the machine direction can be prepared by stretching an undrawn film made of polyethylene 2,6-naphthalate consisting essentially of ethylene 2,6-naphthalate units and having an intrinsic viscosity of at least 0.35, 1. in the machine direction at a draw ratio of 3.5–5 to the original length of the undrawn film at a temperature ranging between 10°C. above the second order transition temperature of the polyethylene 2,6-naphthalate and 170°C., and thereafter
2. in the transverse direction at a draw ratio 50–90 percent of the draw ratio at which the film was stretched in the machine direction, at a temperature ranging between 3°C. above the aforesaid second order transition temperature and 160°C., such temperature further satisfying the following relationship $$25X - 770n + 1200 \leq T \leq 22X - 400n + 700$$

wherein $T$ is the stretching temperature (°C.) in the transverse direction, $X$ is the draw ratio in the transverse direction, and $n$ is the refractive index in the thickness direction of the film whose stretching in the machine direction has been completed. The method of measuring the refractive index, $n$, of the foregoing relationship and the intrinsic viscosity above will be described later.

The polyethylene 2,6-naphthalate to be used as the base polymer of the undrawn film used in the invention will be satisfactory for use if it is one consisting essentially of ethylene 2,6-naphthalate units. Included are not only polyethylene 2,6-naphthalate but also the modified polymers of ethylene 2,6-naphthalate whose modification has been by means of a small quantity, e.g., not more than 10 mol percent, and preferably not more than 5 mol percent, of a third component.

In general, polyethylene 2,6-naphthalate is synthesized by bonding naphthalene 2,6-dicarboxylic acid or the functional derivatives thereof with ethylene glycol or the functional derivatives thereof under suitable reaction conditions in the presence of a catalyst. One or more suitable third components (modifier) may be added before completion of the polymerization of the polyethylene 2,6-naphthalate to form a copolymeric or mixed polyester. As the foregoing third component, the compounds having a bivalent ester forming functional group such, for example, as dicarboxylic acids as oxalic, succinic, adipic, phthalic, isophthalic, terephthalic, naphthalene 2,7-dicarboxylic and diphenylether dicarboxylic acids or the lower alkyl esters thereof can be used; or such known compounds as dihydric alcohols such as propylene glycol and trimethylene glycol can be used. Again, the polyethylene 2,6-naphthalate or its modified polymer may be one whose terminal hydroxyl and/or carboxylic group has been capped by a monofunctional compound such, for example, as benzoic acid, benzoylbenzoic acid, benzyloxybenzoic acid and methoxypolyalkylene glycol; or one modified with a trifunctional ester-forming compound within a scope such that the copolymer obtained is essentially linear.

Further, the foregoing polyester may also contain delustrants such as titanium dioxide, stabilizers such as phosphoric and phosphorous acid and the esters thereof, and additives such as finely divided silica and china clay.

The polymer made up of essentially ethylene 2,6-naphthalate units, as hereinbefore described, is referred to as polyethylene 2,6-naphthalate in the present invention and, of these naphthalate polyesters, those whose intrinsic viscosity is 0.35 or more are used. One whose intrinsic viscosity is less than 0.35 is not desirable, since a useful film cannot be obtained. As the polyethylene 2,6-naphthalate to be used in the invention, one having an intrinsic viscosity of 0.50–0.80 is especially to be preferred from the standpoint of the properties of the resulting product as well as from the standpoint of the stretching operation.

The invention method is applied to an undrawn film formed from a naphthalate polyester such as hereinbefore described. In forming the undrawn film from the naphthalate polyester, the conventional methods, for example, the melt-extrusion technique, can be employed.

According to the invention, in first stretching the undrawn film in the machine direction and thereafter in the transverse direction, the stretching in the machine direction is carried out at a draw ratio of 3.5–5 to the original length of the undrawn film, at a temperature ranging between 10°C. above the second order transition temperature and 170°C. The preferred draw ratio at which the film is stretched in the machine direction is 4–5 to the original length of the undrawn film, and particularly desirable results are obtained when the undrawn film is stretched at a temperature range of 130°–150°C. and at a draw ratio of 4–5 to its original length.

The reason why the temperature and draw ratio must be controlled as hereinabove indicated is because when the initial drawing temperature is lower than the aforesaid temperature which is 10°C. above the second order transition temperature, cold drawing results and only a turbid film of low tenacity and low Young's modulus can be obtained. On the other hand, when the drawing temperature exceeds 170°C., though the resulting film appears to have good transparency, adequate orientation is not imparted because of flow drawing, with the consequence that a film having satisfactory mechanical properties cannot be obtained. Further when the draw ratio in the machine direction is less than 3.5, the tenacity and Young's modulus desired cannot be obtained and, on the other hand, when this draw ratio exceeds 5, the subsequent operation of stretching in the transverse direction becomes difficult. Thus, for the reasons given above, it is especially convenient that in the present invention the stretching in the machine direction is carried out at a temperature in the range of 130°–150°C. and at a draw ratio of 4–5 to the undrawn film's original length.

In the present invention, after having stretched the film in the machine direction, the stretching thereof in the transverse direction is carried out at a draw ratio 50–90 percent, and preferably 60–70 percent, of that in the machine direction, at a temperature ranging between 3°C. above the second order transition temperature of the polyethylene 2,6-naphthalate and 160°C. and moreover a temperature that satisfies the following relationship (the temperature $T$ therein) $25X-770n+1200 \leq T \leq 22X-400n+700$ wherein $T$ is the drawing temperature (°C.) in the transverse direction, $X$ is the draw ratio at which the film is stretched in the transverse direction, and $n$ is the refractive index in the thickness direction of the film whose stretching in the machine direction has been completed, as hereinbefore described.

The reason why the temperature condition is controlled, as hereinabove indicated, in carrying out the stretching in the transverse direction is because when the stretching is carried out at a temperature lower than 3°C. above the second order transition temperature of the polyethylene 2,6-terephthalate used, cold drawing takes place to give rise to the film either becoming turbid or breaking; while, on the other hand, when the temperature exceeds 160°C., the film tends to be stretched irregularly and, in addition, with an increase in the tendency of flow drawing taking place it will be impossible to obtain a film having excellent mechanical properties.

For the reason given above, the stretching in the transverse direction according to the present invention is carried out at a temperature ranging between 3°C. above the second order transition temperature of the polyethylene 2,6-naphthalate used and 160°C., but, as hereinbefore indicated, it is further necessary to carry out this stretching in the transverse direction at a temperature which satisfies the following relationship $25X-770bn+1200 \leq T \leq 22X-400n+700$ wherein $T$, $X$ and $n$ are as hereinbefore defined.

The reason for this is that the aforesaid temperature T°C. to be used in carrying out the stretching of the film in the transverse direction must be suitably chosen in accordance with the degree of orientation and degree of crystallization that have been set up in the film as a result of its stretching in the machine direction that has been carried out in advance of the stretching in the transverse direction as well as the draw ratio at which the stretching in the transverse direction is to be actually carried out. When this temperature in carrying out the stretching in the transverse direction exceeds $(22X-400n+700)$°C., even a slight gauge variation in the starting undrawn film gives rise to marked gauge variation of the drawn film and at times a biaxially oriented film in which stretched and unstretched portions are conjointly present is obtained. On the other hand, when this temperature in carrying out the stretching in the transverse direction is lower than $(25X-770n+1200)$°C., the resulting film either becomes turbid or its breakage takes place. Therefore, the temperature in carrying out the stretching in the transverse direction is conveniently one which is in the range of 120°–140°C. and, in addition, satisfies the hereinbefore indicated relationship.

Further, by conducting the stretching in the transverse direction within the hereinabove indicated range and furthermore at a temperature not higher than that in stretching the film in the machine direction the invention makes possible the preparation of a biaxially oriented film having an especially small amount of the gauge variation and hence is an advantage. Further, when the invented two-stage stretching method of stretching the film in the machine direction followed by stretching it in its transverse direction is carried out directly subsequent to the formation of the undrawn film by, e.g., the melt-extrusion method, there is the advantage that by controlling the temperature in this manner in conducting the stretching in the transverse direction the thickness regulating operation during the extrusion operation of the aforesaid undrawn film becomes simplified.

The stretching in the transverse direction is carried out within the temperature range, as hereinabove indicated, and at a draw ratio of 50–90 percent, and preferably 60–70 percent, of the draw ratio at which the film was stretched in the machine direction.

When the draw ratio of the stretching in the transverse direction becomes less than 50 percent of that of the stretching in the machine direction, the tear strength in the machine direction of the resulting film becomes low and film tends to flex (bend) in the transverse direction, while, on the other hand, when the draw ratio becomes greater than 90 percent of that at which it was stretched in the machine direction, the Young's modulus and tensile strength of the resulting film in the machine direction becomes low, with the consequence that the obtainment of a film excelling in its properties in the machine direction directly by the two-stage stretching method, as intended by the present invention, cannot be achieved. For the foregoing reason, it is of particular advantage to ensure that the stretching in the transverse direction is carried out so that the draw ratio is 60–70 percent of that at which it was stretched in the machine direction.

According to the invention, a film excelling in both the machine and the transverse directions, and especially the machine direction, in such physical properties as, for example, tensile strength, Young's modulus and dimensional stability can be obtained by conducting the two-stage stretching in the machine and the transverse directions in the sequence given.

Again, in accordance with the invention, when the biaxially oriented film obtained after having carried out the hereinabove indicated two-stage stretching in the machine and the transverse directions is heat-treated further at a temperature in the range of 170°–250°C., and preferably 180°–230°C., the heat shrinkage of said biaxially oriented film becomes small and its thermal stability is improved. The heat treatment can be carried out be exposing the biaxially oriented film to the atmosphere of foregoing temperature, e.g., for about 2 seconds –5 minutes, and preferably about 4–60 seconds. When the heat treatment temperature becomes higher than the range indicated above, the gauge variation of the film tends to increase and, in addition, there is the drawback that the molecular orientation of the film is disarranged to cause a decline of its Young's modulus. On the other hand, when the temperature of the heat treatment is lower than that indicated, heat treatment effects are not fully demonstrated. In either case of a higher or lower temperature than that indicated, desirable results are unobtainable.

According to the invention, by a simple stretching operation consisting of a two-stage stretching of the undrawn film in the machine and the transverse directions in the sequence given followed further by a heat treatment, a polyethylene 2,6-naphthalate film possessing a small heat shrinkage, great thermal stability, and a small amount of gauge variation, as well as the previously noted excellent physical properties can be obtained. In addition, the film obtained in this invention excels in its resistance to hydrolysis.

Hence, the film prepared by the invention process finds wide use for such purpose as, for example, electrical insulating materials such as electric wire covering tape and adhesive tape as well as for various kinds of continuous film.

The measurement values given in the specification and claims and the following examples were values obtained in the following manner.

Intrinsic viscosity

Intrinsic viscosity is calculated from the equation:

$$\text{intrinsic viscosity} = \lim_{c \to 0} \frac{\ln \eta r}{C}$$

wherein $C$ is the concentration in grams of the polymer in 100 ml. solvent and $\eta r$ is the relative viscosity measured at 35°C. The solvent used herein is a mixture of 6 parts of phenol and 4 parts of orthodichlorobenzene (by weight).

Refractive index

Measurement was made with a light of wavelength 589 m$\mu$ (center of the D lines) at a temperature of 20°C. using an Abbe refractometer.

Film gauge variation

A film from whose both edges were trimmed a 7-cm strip was continuously measured for its thickness over the entire width of the film by means of a beta-ray thickness measuring instrument. The value of the gauge variation was obtained as follows from the maximum and minimum thickness values.

Gauge variation =

$$\left( \frac{\frac{\text{maximum thickness} - \text{minimum thickness}}{2}}{\text{Average thickness}} \right)$$

$\times 100(\%)$

Heat shrinkage

A film of original dimension, $l_0$, was allowed to stand for a prescribed period of time in a hot air type constant temperature oven in a free state, after which the dimension, $l_1$, of the film was measured. The heat shrinkage value was then obtained as follows:

$$\text{Heat shrinkage} = \frac{l_0 - l_1}{l_0} \times 100(\%)$$

Tensile strength at break, elongation at break, Young's modulus and stress at 5 % elongation These values were measured by the following methods in an atmosphere of 23°C. and 65 percent relative humidity, using an Instron tensile testing machine.

Method A.
Shape of specimen: Rectangular (15 cm long, 1 cm wide)
Distance between grips at start of test: 10 cm
Strain rate: 10 cm/min.

Method B.
Shape of specimen: Dumbbell (total length 10 cm, length of narrow part 4 cm, width of gripping part 2 cm, width of narrow part 1 cm)
Distance between grips at start of test: 5 cm
Strain rate: 2 cm/min.

On the other hand, the evaluation of the stretchability in the examples was in accordance with the following standard.

A. The stretching takes place apparently uniformly.

B. Conjoint presence of stretched and unstretched portions are observed in the film and thus non-uniformity is outwardly apparent.

C. Breakage or devitrification takes place during the stretching operation.

Examples 1–6 and Controls 1–6

An undrawn film 200 microns in thickness and 40 cm in width prepared using polyethylene 2,6-naphthalate of intrinsic viscosity 0.70 was first stretched at a draw ratio of either 3.5, 4.0 or 4.5 in the machine direction at 130°C., after which it was stretched at a draw ratio of 3.0 in the transverse direction varying the drawing temperatures, whereupon the relationship between the drawing temperature, stretchability and film properties such as shown in Table 1 was obtained.

TABLE 1

| Experiment No. | Draw ratio in machine direction | Refractive index in thickness direction after stretching in machine direction | Drawing temperature transverse direction (° C.) | Stretchability when stretched in transverse direction | Gauge variation in transverse direction of resulting film (percent) |
|---|---|---|---|---|---|
| Control 1 | 3.5 | 1.550 | 110 | C | |
| Example 1 | 3.5 | 1.550 | 120 | A | ±3 |
| Example 2 | 3.5 | 1.550 | 130 | A | ±5 |
| Control 2 | 3.5 | 1.550 | 150 | A | ±20 |
| Control 3 | 4.0 | 1.535 | 115 | C | |
| Example 3 | 4.0 | 1.535 | 125 | A | ±4 |
| Example 4 | 4.0 | 1.535 | 135 | A | ±5 |
| Control 4 | 4.0 | 1.535 | 155 | A | ±23 |
| Control 5 | 4.5 | 1.525 | 115 | C | |
| Example 5 | 4.5 | 1.525 | 120 | A | ±3 |
| Example 6 | 4.5 | 1.525 | 140 | A | ±6 |
| Control 6 | 4.5 | 1.525 | 160 | B | ±35 |

From the foregoing results, it is apparent that in the case of the films obtained in Examples 1–6 which satisfy the conditions of the present invention as to the temperature used when stretching the films in the transverse direction, their stretchability was good and the gauge variation was small. In contrast, in the case of the films obtained in Controls 2 and 4 which do not satisfy the conditions of the invention as to the temperature used when stretching the films in the transverse direction, the gauge variation of the films obtained was excessive though they could apparently be stretched uniformly. Hence they lacked usefulness. As regards the film obtained on Control 6, its poor stretchability is obvious. On the other hand, in the case of Controls 1, 3 and 5, measurement of the gauge variation could not be carried out, since the films broke during the stretching operation.

Examples 7–16 and Controls 7–11

After drying the pellets of polyethylene 2,6-naphthalate of an intrinsic viscosity 0.64 containing 0.125 percent of china clay in a hot air dryer for 3 hours at 165°C., the pellets were melted and extruded at 300°C. through a T die, followed by cooling and solidifying on a cooling drum (temperature 70°C.) to obtain an undrawn film (180 microns in thickness and 50 cm in width). The so obtained undrawn film was stretched in the machine direction at a draw ratio of either 3.5, 4.0, 4.5 or 4.7 and thereafter stretched in transverse direction under the conditions indicated in Table 2 varying the draw ratio. This was followed in all cases by a heat treatment for 10 seconds at 210°C. The relationship between the draw ratio the film was stretched in the machine direction, the draw ratio the film was stretched in the transverse direction, the stretchability and properties of the film is shown in Table 2.

ceeding 90 percent of the draw ratios they were stretched in the machine direction, the Young's modulus in the machine direction was unsatisfactory. On the other hand, it is seen that in the case of the films of Controls 10 and 11 in which the films were stretched in the transverse direction at draw ratios less than 50 percent of draw ratios at which they were stretched in the machine direction, the tear strength in the machine direction became exceedingly poor. In contrast, the films of Examples 7–16 according to the invention method excelled in their Young's modulus in the machine direction, as well as were excellent in their tear strength in the machine direction and uniformity of thickness in the transverse direction.

Controls 12–19

Polyethylene terephthalate of an intrinsic viscosity of 0.65, as measured at 35°C. on a solution in o-chlorophenol, was melt-extruded at a temperature of 280°C. through a T die and cooled and solidified on a cooling drum held at 40°C. to prepare an undrawn film (thickness 200 microns, width 40 cm). The so obtained film was then subjected to biaxial stretching successively under the conditions indicated in Table 3, in the machine and the transverse directions in the sequence given, using a conventional forward drawing machine and a tenter. The relationship between the stretching conditions in the machine and the transverse directions, and the stretchability and the properties of the resulting film is shown in Table 3.

TABLE 3

| Control No. | Machine direction stretching | | Transverse direction stretching | | Stretch- ability | Gauge variation in the transverse direction (percent) |
| --- | --- | --- | --- | --- | --- | --- |
| | Temperature (°C.) | Draw ratio | Temperature (°C.) | Draw ratio | | |
| 12 | 85 | 3.5 | 100 | 3.0 | A | ±10. |
| 13 | 85 | 3.8 | 100 | 3.3 | A | ±15. |
| 14 | 90 | 4.0 | 100 | 3.4 | A | ±20. |
| 15 | 90 | 4.5 | 110 | 2.5 | B | Unstretched portion conjointly present. |
| 16 | 90 | 4.5 | 110 | 2.8 | B | Do. |
| 17 | 90 | 4.5 | 110 | 3.0 | B | Do. |
| 18 | 90 | 4.5 | 110 | 3.6 | B | Do. |
| 19 | 90 | 4.5 | 110 | 4.0 | C | |

As is apparent from the foregoing results, if in carrying out the successive biaxial stretching of an undrawn film of polyethylene terephthalate in the machine and transverse directions the film is stretched in the transverse direction at a draw ratio less than 90 percent of that at which it was stretched in the machine direction,

TABLE 2

| Experiment No. | Draw ratio machine direction | Draw ratio transverse direction | Drawing temperature transverse direction (°C.) | Tensile strength at break* (kg./cm.²) | | Young's modulus* (kg./cm.²) | | Tear strength (Elemendorf) (kg./mm.) | | Gauge variation in the transverse direction |
| --- | --- | --- | --- | --- | --- | --- | --- | --- | --- | --- |
| | | | | MD | TD | MD | TD | MD | TD | |
| Example 7 | 3.5 | 3.1 | 120 | 3,000 | 2,400 | 67,000 | 53,000 | 0.44 | 0.58 | ±3 |
| Control 7 | 3.5 | 3.5 | 125 | 2,750 | 2,690 | 62,000 | 61,000 | 0.51 | 0.49 | ±2 |
| Control 8 | 3.5 | 3.8 | 130 | 2,580 | 2,900 | 59,000 | 64,000 | 0.55 | 0.44 | ±2 |
| Example 8 | 4.0 | 2.5 | 118 | 3,300 | 1,800 | 70,000 | 48,000 | 0.30 | 0.71 | ±3 |
| Example 9 | 4.0 | 3.3 | 125 | 3,200 | 2,000 | 68,500 | 52,000 | 0.38 | 0.66 | ±3 |
| Example 10 | 4.0 | 3.6 | 130 | 3,100 | 2,200 | 68,000 | 55,000 | 0.45 | 0.55 | ±2 |
| Control 9 | 4.0 | 3.8 | 140 | 2,800 | 2,500 | 64,000 | 58,000 | 0.45 | 0.50 | ±2 |
| Control 10 | 4.5 | 2.0 | 120 | 3,800 | 1,400 | 90,000 | 38,000 | 0.19 | 0.82 | ±8 |
| Example 11 | 4.5 | 2.5 | 125 | 3,680 | 1,900 | 85,000 | 50,000 | 0.30 | 0.68 | ±4 |
| Example 12 | 4.5 | 2.8 | 130 | 3,550 | 2,380 | 79,000 | 55,000 | 0.35 | 0.60 | ±3 |
| Example 13 | 4.5 | 3.0 | 130 | 3,450 | 2,450 | 75,000 | 57,000 | 0.40 | 0.59 | ±3 |
| Control 11 | 4.7 | 2.2 | 120 | 3,900 | 1,500 | 92,000 | 36,000 | 0.20 | 0.79 | ±10 |
| Example 14 | 4.7 | 2.5 | 125 | 3,850 | 1,950 | 85,000 | 52,000 | 0.31 | 0.69 | ±4 |
| Example 15 | 4.7 | 3.0 | 130 | 3,500 | 2,290 | 82,000 | 58,000 | 0.36 | 0.62 | ±3 |
| Example 16 | 4.7 | 3.3 | 135 | 3,430 | 2,400 | 78,000 | 60,000 | 0.39 | 0.59 | ±2 |

*Measured in accordance with Method A.

As apparent from the foregoing results, in the case of the films of Controls 7, 8 and 9 in which the films were stretched in the transverse direction at draw ratios exeither the gauge variation increases or uniformity of the stretching is not achieved.

Examples 17–18 and Controls 20–24

An undrawn film of polyethylene terephthalate (PET) prepared as in Control 12 was biaxially stretched under the conditions indicated in Table 4 successively in the machine and the transverse direction in the sequence given, followed by re-stretching in the machine direction and thereafter submitting the so stretched film to a heat treatment to prepare a tensilized film. Separately, an undrawn film of polyethylene 2,6-naphthalate (PEN) prepared as in Example 7 was biaxially stretched under the conditions indicated in Table 4 successively in the machine and transverse directions in the sequence given and thereafter submitted to a heat treatment to prepare an oriented film having high tensile strength and Young's modulus in the machine direction and also possessing excellent dimensional stability. The properties of the several films thus obtained are shown in Table 5.

layer. Hence these films are not desirable for this purpose. On the other hand, the film prepared under such conditions as to reduce the heat shrinkage in the machine direction (Controls 22, 23) has a low tensile strength, Young's modulus and stress at 5 percent elongation in the machine direction. Consequently, the magnetic tape obtained by coating a magnetic layer on this film is inadequate in respect of its mechanical dimensional stability. Again, in the case of the film which was only biaxially stretched successively in the machine and the transverse directions and thereafter heat treated (Control 24), the tensile strength, Young's modulus and stress at 5 percent elongation were extremely poor.

Examples 19–26

An undrawn film prepared as in Example 7 using

TABLE 4.—STRETCHING CONDITIONS

| Experiment No. | Polymer | Machine direction stretching | | Transverse direction stretching | | Re-stretching in machine direction | | Heat treatment temperature (°C.) |
|---|---|---|---|---|---|---|---|---|
| | | Temperature (°C.) | Draw ratio | Temperature (°C.) | Draw ratio | Temperature (°C.) | Draw ratio | |
| Control 20 | PET | 90 | 3.6 | 110 | 3.6 | 170 | 1.4 | 190 |
| Control 21 | PET | 90 | 3.4 | 110 | 3.6 | 170 | 1.5 | 190 |
| Control 22 | PET | 90 | 3.5 | 110 | 3.6 | 170 | 1.4 | 200 |
| Control 23 | PET | 90 | 3.6 | 110 | 3.6 | 170 | 1.3 | 205 |
| Control 24 | PET | 90 | 4.0 | 100 | 3.7 | | | 200 |
| Example 17 | PEN | 130 | 4.5 | 125 | 2.8 | | | 200 |
| Example 18 | PEN | 135 | 4.7 | 130 | 3.0 | | | 200 |

TABLE 5.—FILM PROPERTIES (MACHINE DIRECTION)

| Experiment No. | Stress at 5% elongation [a] (kg./cm.²) | Young's modulus [a] (kg./cm.²) | Tensile strength at break [a] (kg./cm.²) | Elongation at break [a] (percent) | Heat shrinkage [b] (percent) |
|---|---|---|---|---|---|
| Control 20 | 1,800 | 74,000 | 3,600 | 60 | 9.0 |
| Control 21 | 1,780 | 73,000 | 3,400 | 63 | 8.8 |
| Control 22 | 1,500 | 60,000 | 3,000 | 80 | 3.7 |
| Control 23 | 1,520 | 63,000 | 2,980 | 78 | 3.9 |
| Control 24 | 1,300 | 53,000 | 2,950 | 110 | 3.0 |
| Example 17 | 2,080 | 79,000 | 3,500 | 40 | 3.1 |
| Example 18 | 2,100 | 80,000 | 3,480 | 38 | 3.2 |

[a] Measured in accordance with Method A.
[b] Heat shrinkage (1 hr., 150° C.).

As apparent from Table 5, in the case of polyethylene terephthalate, the film prepared therefrom under conditions aimed at increasing its tensile strength, Young's modulus and stress at 5 percent elongation (Controls 20, 21) has a very high heat shrinkage in the machine direction, with the consequence that shrinkage or decline in productivity is brought about during the step of coating the magnetic polyethylene 2,6-naphthalate of an intrinsic viscosity 0.54 was first stretched at a draw ratio of 4.5 at 140°C. in the machine direction and then stretched at a draw ratio of 2.8 at 130°C. in the transverse direction, after which it was also heat-treated at a temperature and time indicated in Table 6. The relationship between the heat treatment conditions and the properties of the resulting film are shown in Table 6.

TABLE 6

| Example No. | Heat treatment temperature (°C.) | Heat treatment time (sec.) | Condition of tension | Tensile strength at break [a] (kg./cm.²) | | Elongation at break [a] (percent) | | Young's modulus [a] (kg./cm.²) | | Heat shrinkage [b] (percent) | |
|---|---|---|---|---|---|---|---|---|---|---|---|
| | | | | MD | TD | MD | TD | MD | TD | MD | TD |
| 19 | | | No heat treatment | 3,430 | 2,200 | 30 | 58 | 80,000 | 48,000 | 30 | 25 |
| 20 | 170 | 10 | Under tension | 3,480 | 2,240 | 32 | 60 | 78,900 | 51,000 | 5.4 | 3.8 |
| 21 | 170 | 20 | ...do... | 3,470 | 2,260 | 33 | 60 | 79,000 | 50,500 | 4.7 | 3.3 |
| 22 | 210 | 5 | ...do... | 3,500 | 2,390 | 40 | 65 | 78,800 | 55,000 | 3.3 | 2.0 |
| 23 | 210 | 10 | ...do... | 3,520 | 2,380 | 42 | 67 | 78,500 | 55,800 | 3.1 | 1.9 |
| 24 | 210 | 10 | Under 3% shrinkage in transverse direction | 3,510 | 2,400 | 41 | 70 | 78,700 | 55,400 | 3.2 | 0.5 |
| 25 | 240 | 5 | Under tension | 3,530 | 2,390 | 45 | 70 | 74,000 | 59,000 | 2.2 | 1.5 |
| 26 | 240 | 5 | Under 5% shrinkage in transverse direction | 3,520 | 2,360 | 44 | 73 | 74,300 | 57,000 | 2.1 | 0.2 |

[a] Measured in accordance with Method A.
[b] Shrinkage (1 hr., 150° C.).

Example 27 and Control 25

An undrawn film prepared from polyethylene 2,6-naphthalate of an intrinsic viscosity 0.61 was stretched at a draw ratio of 4.5 at 130°C. in its machine direction and then stretched at a draw ratio of 2.5 at 120°C. in its transverse direction, following which it was heat-treated at 230°C. A comparison of the properties of a film obtained in this manner (thickness 8 microns) and those of a commercially available very thin tensilized polyethylene terephthalate film for magnetic tape use (thickness 12 microns) is made with the results shown in Table 7.

TABLE 7

| Experiment No. | Polymer | Stress at 5% elongation (kg./cm.²) | | Tensile strength at break* (kg./cm.²) | | Elongation at break* (percent) | | Young's modulus* (kg./cm.²) | |
|---|---|---|---|---|---|---|---|---|---|
| | | MD | TD | MD | TD | MD | TD | MD | TD |
| Example 27 | Polyethylene 2,6-naphthalate | 2,000 | 1,100 | 3,100 | 1,500 | 40 | 60 | 80,000 | 48,000 |
| Control 25 | Polyethylene terephthalate | 1,600 | 1,000 | 2,500 | 2,300 | 50 | 80 | 62,000 | 44,000 |

*Measured in accordance with Method B.

Example 28

Polyethylene naphthalate of an intrinsic viscosity of 0.70 obtained in customary manner by the cocondensation of a mixture of 90 mol percent of dimethyl 2,6-naphthalate and 10 mol percent of dimethyl terephthalate was melt-extruded through a T die to obtain an undrawn film. When the so obtained undrawn film was first stretched at a draw ratio of 4.0 at 140°C. in the machine direction and then at a draw ratio of 3.0 at 125°C. in the transverse direction, the resulting film had the properties shown in Table 8.

TABLE 8

| | Machine Direction | Transverse Direction |
|---|---|---|
| Stress at 5% elongation (kg/cm²)* | 1950 | 1360 |
| Tensile strength at break (kg/cm²)* | 2540 | 1500 |
| Elongation at break (%)* | 34 | 43 |
| Young's modulus (kg/cm²)* | 64000 | 40000 |
| Heat shrinkage (200°C., 1 min) (%) | 57 | 61 |

*Measured in accordance with Method B.

Next, when this film was heat treated for 10 seconds at 190°C., the properties of the film were improved as shown in Table 9.

TABLE 9

| | Machine Direction | Transverse Direction |
|---|---|---|
| Stress at 5 % elongation (kg/cm²)* | 1870 | 1320 |
| Tensile strength at break (kg/cm²)* | 2760 | 1620 |
| Elongation at break (%)* | 54 | 61 |
| Young's modulus (kg/cm²)* | 73000 | 45000 |
| Heat shrinkage (200°C., 1 min.) (%) | 2 | 3 |

*Measured in accordance with Method B.

Example 29

Polyethylene 2,6-naphthalate (intrinsic viscosity 0.58) cocondensed with 3 mol percent of adipic acid was melt-extruded at 300°C. through a T die to obtain an undrawn film (thickness 200 microns). The so obtained undrawn film was first stretched at a draw ratio of 4.0 at 130°C. in the machine direction and then at a draw ratio of 3.2 at 128°C. in the transverse direction, after which the film was heat treated for 5 seconds at 230°C., whereupon a film having the properties shown in Table 10 was obtained.

TABLE 10

| | Machine Direction | Transverse Direction |
|---|---|---|
| Stress at 5 % elongation (kg/cm²)* | 1560 | 1290 |
| Tensile strength at break (kg/cm²)* | 3100 | 2100 |
| Elongation at break (%)* | 65 | 72 |
| Young's modulus (kg/cm²)* | 67500 | 51800 |
| Heat shrinkage (150°C., 1 hr) (%) | 1.2 | 0.8 |

*Measured in accordance with Method A.

Example 30 and Control 36

An undrawn film prepared film polyethylene 2,6-naphthalate of an intrinsic viscosity 0.70 was first stretched at a draw ratio of 4.25 at 130°C. in the extrusion direction (machine direction) and thereafter stretched at a draw ratio of 3.0 at 130°C. in the direction at right angles to the direction of extrusion, after which the stretched film was heat-treated for 10 seconds at 190°C. The resistance to hydrolysis of the so obtained film was compared with that of a polyethylene terephthalate film with the results shown in Table 11.

TABLE 11.—RESISTANCE TO HYDROLYSIS

| Experiment No. | Specimen | Test conditions | | | Retension of tenacity (percent) | | |
|---|---|---|---|---|---|---|---|
| | | Thickness (microns) | Temperature (° C.) | Pressure (kg./cm.²) | Stress at 5% elongation | Tensile strength at break | Elongation at break |
| Example 30 | Polyethylene naphthalate film | 22 | 160 | 5 | 110 | 85 | 85 |
| | do | 22 | 186 | 10 | 140 | 135 | 80 |
| | do | 22 | 210 | 20 | 95 | 60 | 25 |
| Control 26 | Polyethylene terephthalate film | 25 | 160 | 5 | 110 | 90 | 85 |
| | do | 25 | 186 | 10 | 100 | 60 | 40 |
| | do | 25 | 210 | 20 | Film disintegrated | | |

The method of testing the resistance to hydrolysis used in this example was carried out in the following manner. The film in tape form (10 mm wide) was wrapped spirally about a metallic pipe 10 mm in diameter and the ends of the film were fastened. A 1-liter autoclave was filled with 100 cc of water and the aforesaid specimen was placed therein in such a manner that the film did not become immersed in the water. The autoclave was then closed and its temperature was raised to the prescribed temperature at a constant rate (3°C./min.) Upon reaching the prescribed temperature, the autoclave was purged of the steam and the specimen was taken out and its tensile mechanical properties were measured by the Method A.

Example 31

A 75 micron-thick polyethylene 2,6-naphthalate film was prepared by extruding polyethylene 2,6-naphthalate of an intrinsic viscosity of 0.53 through a flat die, stretching the resulting film in the machine direction at 140°C. at a draw ratio of 3.8, then in the transverse direction 3.4 at 130°C., and thereafter heat-treating the film for 5 seconds at 230°C. The accelerated heat degradation test of the so obtained film was conducted by allowing it to stand in its free state in air of varying elevated temperatures. The results obtained are shown in Table 12. Since it was deemed as a result of this test that the film was fully useable as the material in the class F of thermal classification of electrical insulation, the motorette test was carried out. The results of the motorette test demonstrated that the film had sufficient resistance to the cycles involving heating, vibration and hygroscopicity for 3 days at 240°C., 10 days at 220°C. and 30 days at 200°C. The test shows that film can be used at 175°–195°C. for years.

film is thin and hence can be satisfactorily put into practical use.

Thus, the film prepared by the invention method possesses particular advantages when used as the base support of the magnetic recording tape. For example, a magnetic recording tape can be made by the formation of a thin layer of magnetic particles on the surface of the film prepared by the invention method. The invention film, as apparent from the hereinbefore given examples, has a small heat shrinkage. Hence it is convenient because the shrinkage of the base film is prevented during the process of forming the thin layer of magnetic particles thereon. The resulting magnetic recording tape has, as hereinbefore noted, the superior physical properties in the machine direction even though the base film is thin. In particular, since the film possesses a high stress at 5 percent elongation and a high Young's modulus, no distortion of recording occurs even though it is momentarily subjected to a considerably great tensile force. Again, since this film has the hereinbefore noted excellent properties such as to make possible its satisfactory use as the base support of magnetic recording tape even though it is thinner than the conventional films, either the recording time can be made longer with a package of the same size or the package can be made smaller when the invention film is used as the base support in making a magnetic recording tape. Thus, the invention film has great advantages.

Further, the film prepared by the invention method can be put into various decorative or commercial uses by electroplating or vapor deposition of it with metal or by coating it with metallic powders using adhesives. Alternatively, the metal-coated film can be formed into fibers and be used for decorative or electroconductive fibers which are required to have high tensile strength

TABLE 12.—PRINCIPAL PROPERTIES AFTER 30 DAYS AT 230° C.*

| Properties | Initial value | Values of properties after 30 days×230° C. | Remarks |
|---|---|---|---|
| Specific gravity | 1.362 | 1.370 | Density method. |
| Degree of crystallinity, percent | 44 | 55 |  |
| Tensile strength at break, kg./cm.² | 2,100 | 1,970 | Measured by Method B. |
| Elongation at break, percent | 70 | 49 | Do. |
| Young's modulus, kg./cm.² | 50,700 | 74,000 | Do. |
| Dielectric strength, kv./mm | 205 | 215 | Short time test (ASTM D-149). |
| Volume resistivity, Ω·cm | $1.5 \times 10^{16}$ | $1.2 \times 10^{16}$ | 1 min. value at 20°C. |
| Dielectric constant | 3.21 | 2.80 | At 100° C. 60 Hz. |
| Dielectric power factor | $6.5 \times 10^{-3}$ | $5.4 \times 10^{-3}$ | At 100° C. 60 Hz. |

*Hot air type constant temperature oven used.

When a polyethylene terephthalate film was thermally degraded under the hereinabove indicated conditions, the film became too brittle to measure its mechanical and electrical properties.

As apparent from the foregoing Tables 5 and 6, it is possible according to the present invention to obtain a biaxially oriented film in which the stress at 5 percent elongation, tensile strength at break and Young's modulus are very high as well as heat shrinkage is low in the machine direction by stretching biaxially an undrawn film of polyethylene 2,6-naphthalate in the machine and the transverse direction in the sequence given. In addition, as shown in Table 2, this biaxially oriented film obtained by the invention method has only a small amount of gauge variation. Hence, the film prepared according to the invention method has a stress at 5 percent elongation, tensile strength at break and Young's modulus which are high even though the and Young's modulus in the machine direction.

We claim:

1. A method of preparing a biaxially oriented polyethylene 2,6-naphthalate film which consists essentially of stretching an undrawn film formed from polyethylene 2,6-naphthalate consisting essentially of ethylene 2,6-naphthalate units and having an intrinsic viscosity of at least 0.35, 1. in the machine direction at a draw ratio of 3.5–5 to the original length of said undrawn film at a temperature ranging between 10°C. above the second order transition temperature of said polyethylene 2,6-naphthalate and 170°C.; and thereafter 2. in the transverse direction at a draw ratio 50–90 percent of that at which the film was stretched in the machine direction, at a temperature not higher than the temperature of stretching in the machine direction ranging between 30°C. above said second order transition temperature and 160°C., said temperature further satisfying the following relationship $$25X-770n+1200 \leq T \leq 22X-400n+700$$

wherein $T$ is the drawing temperature (°C.) when stretching the film in the transverse direction, $X$ is the draw ratio when stretching the film in the transverse direction, and $n$ is the refractive index in the thickness direction of the film after stretching in the machine direction.

2. The method of claim 1 wherein said undrawn film is stretched at a draw ratio of 4–5 to its original length in the machine direction and thereafter stretched at a draw ratio of 60–70 percent of that at which it was stretched in the machine direction.

3. The method of claim 1 wherein said undrawn film is
 1. stretched in the machine direction at a draw ratio of 4–5 to its original length at a temperature in the range of 130°–150°C.; and thereafter
 2. stretched in the transverse direction at a temperature in the range of 120°–140°C. at a draw ratio of 60–70 percent of that at which the film was stretched in the machine direction.

4. The method of claim 1 wherein the film is heat treated at a temperature in the range of 170°–250°C. for a period of 2 seconds to 5 minutes after stretching in the transverse direction.

* * * * *

UNITED STATES PATENT OFFICE
CERTIFICATE OF CORRECTION

Patent No. 3,683,060                    Dated August 8, 1972

Inventor(s) Takashi Tanabe, Hiroshi Aoiki, Hitoshi Murakami, ans Fujio Matsumoto It is certified that error appears in the above-identified patent and that said Letters Patent are hereby corrected as shown below:

Claim 1, paragraph 2, line 5, change "30°C." to --3°C.--

Signed and sealed this 23rd day of January 1973.

(SEAL)
Attest:

EDWARD M. FLETCHER, JR.                ROBERT GOTTSCHALK
Attesting Officer                      Commissioner of Patents